W. L. ADAMS.
FISHING REEL.
APPLICATION FILED AUG. 15, 1916. RENEWED OCT. 1, 1920.
1,399,536. Patented Dec. 6, 1921.
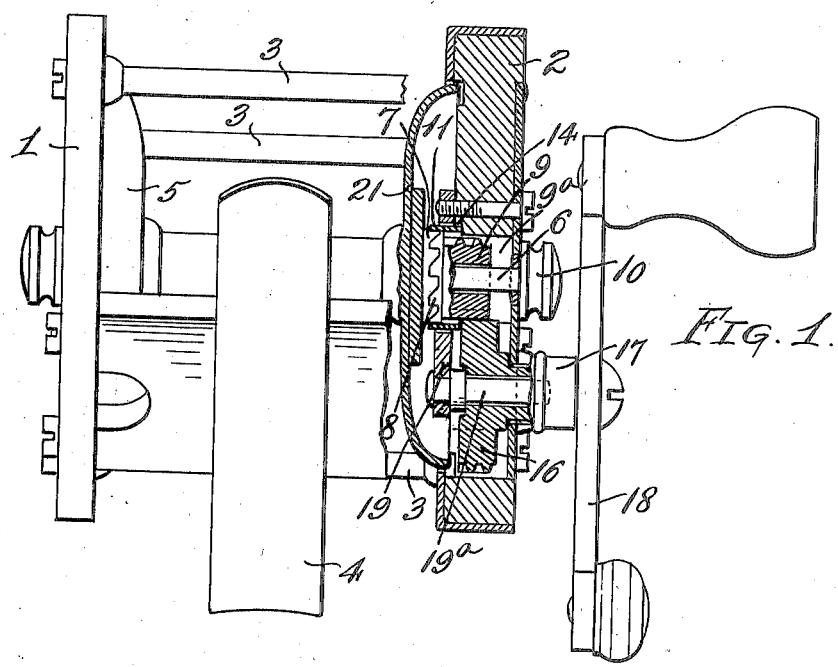
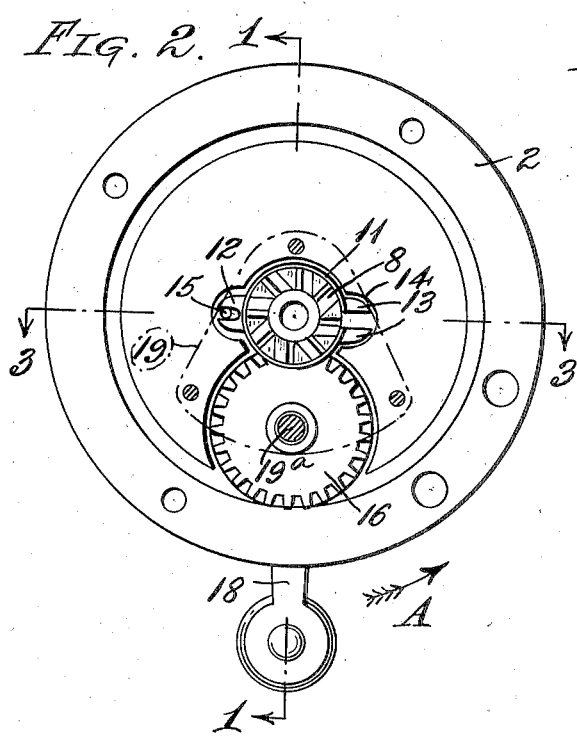
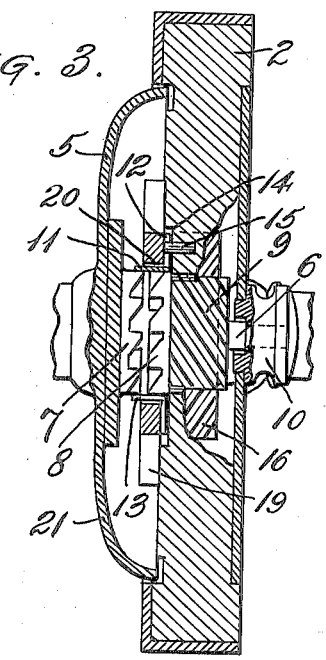
Inventor.
Walter L. Adams
By Brockett and Hyde
Atty's.

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

FISHING-REEL.

1,399,536.   Specification of Letters Patent.   Patented Dec. 6, 1921.

Application filed August 15, 1916, Serial No. 115,068. Renewed October 1, 1920. Serial No. 414,128.

*To all whom it may concern:*

Be it known that I, WALTER L. ADAMS, citizen of the United States, residing at Akron, in the county of Summit and State of Ohio, have invented certain new and useful Improvements in Fishing-Reels, of which the following is a specification.

This invention relates to fishing reels, and more particularly to what are known as free spool reels. The object of the invention is to provide a fishing reel whose spool is positively driven for winding up the line, but which can be readily disengaged from its driving means so as to turn freely in either direction by simple manipulation of the winding handle, and which also can be re-engaged for positive drive by the usual turning movement of the handle in the winding direction.

Further objects of the invention are in part obvious and in part will appear more in detail hereinafter.

In the drawings, which represent one embodiment of the invention, Figure 1 is an elevation partly in section on the line 1—1, Fig. 2; Fig. 2 is an end view of the end frame plate and the spool looking at the driving clutch member, a cover plate being omitted; and Fig. 3 is an enlarged section on the line 3—3, Fig. 2.

The reel shown in the drawings comprises a frame consisting of two end plates 1, 2 connected by longitudinal rods 3 one of which carries the usual base member 4 to be attached to the fishing pole. Between said end plates is mounted the spool 5 to receive the line, said spool at one end being journaled to rotate freely in the end plate 1 and at its opposite end having a spindle 6 carrying a rigid toothed clutch member 7 coöperating with a driving clutch member 8 which is attached to or integral with a gear 9, and which driving clutch and gear are sleeved upon and both rotate and slide upon the spindle 6, whose outer end is journaled in a bearing 10 carried by the end plate 2.

Surrounding the clutch member 8 is a light split band or brake 11 having a notched ear 12 at one side and two ears 13 at its opposite side, said ears lying in a shallow seat or recess 14' of the end plate and the notch in ear 12 receiving a small teat or pin 15 on said plate and which, with the recess 14, prevents rotation of the brake in its seat. Said brake is made of resilient material and clasps or embraces the periphery of the clutch member and produces a light frictional action thereon for a purpose which will appear.

The gear 9 rotates in a cavity $9^a$ in the inner face of the end plate and meshes with a driving gear 16 in an adjoining cavity, which driving gear is on the inner end of a sleeve 17 journaled in the end plate and having a suitable operating handle 18 on its outer end. The two gears are held in mesh and confined in their cavities by a plate 19 screwed to the inner face of the end plate and having a spindle $19^a$ to support sleeve 17, and which plate also covers the ears of the brake member 11 and confines it to its seat and has an opening 20 to receive the friction band portion of said brake. The working parts on the inner face of the end plate, in the assembled reel, are inclosed and protected from dirt and the weather by the end head 21 of the spool.

The teeth of the two gears 9, 16 are cut on a spiral or incline of about 36°, as shown in Fig. 3, and gear 9 is slightly longer than gear 16 so as to have full engagement therewith and yet have movement longitudinally of the spindle 6.

The reel operates as follows:

To wind up the line the operating handle and driving gear 16 are rotated in the direction of arrow A, Fig. 2. Brake band 11 exerts a slight retarding effect upon the gear 9 and clutch 8, sufficient to enable the inclined teeth of gear 16 to exert an endwise thrust upon gear 9 in the direction of its axis and, because of the direction of inclination of said teeth, to produce endwise movement of gear 9 and clutch 8 toward the clutch 7 and operatively engage said clutches. By turning the operating handle in the winding direction the clutches are, therefore, engaged and the spool rotated positively to wind up the line.

As long as pressure in the winding direction is maintained upon the operating handle even though said handle is held stationary or released, the inclination of the gear teeth and the pull on the line holds the clutches in engagement. By slightly rotating the operating handle in the reverse or unwinding direction, the spiral teeth of gear 16 exert an end thrust upon the teeth of gear 9 and produce movement of said gear along spindle 6 in the opposite direction until the clutches are disengaged, in which position the spool is entirely uncoupled from its driving mechanism and rotates freely in either direction.

Brake band 11 exerts a constant frictional pressure upon the periphery of clutch 7 and always tends to retard the rotation of gear 9, and produces sufficient resistance to enable the end thrust on the inclined gear teeth, to take effect and move said gear 9 and its clutch 8 longitudinally of the spindle 6.

The brake also holds gear 9 and clutch 8 against accidental endwise movement, and whatever may be the position of said clutch, either engaged with or disengaged from clutch 7, prevents it from shifting to the other position until positively so moved by rotation of the operating handle.

The reel described is of simple construction and enables the operator to positively turn the spool in the winding direction by merely rotating the operating handle in the forward direction and by a slight backward rotation of said handle to convert the reel into a free spool reel. The fish can, therefore, be readily played without removing the hand from the operating handle.

What I claim is:—

1. A fishing reel, comprising a frame, a spool therein, two inclined tooth gears for driving said spool, the inclined teeth of said gears tending to shift them along their axes, one of said gears having motion along its axis for connecting it to and disconnecting it from said spool, and a friction brake arranged to retard the rotation of said movable gear.

2. A fishing reel, comprising a frame, a spool therein, two coöperating inclined tooth gears for driving said spool, the inclined teeth of said gears tending to shift them along their axes, one of said gears having motion longitudinally of its axis, a clutch controlled by said movable gear, and a friction brake arranged to retard the rotation of said movable gear.

3. A fishing reel, comprising a frame, a spool therein, two coöperating inclined tooth gears, one of which is movable along its axis, the inclined teeth of said gears tending to shift them along their axes, a clutch member connected to said spool, a clutch member connected to said movable gear, and a friction brake arranged to retard the rotation of said movable gear.

4. A fishing reel, comprising a frame, a spool therein, driving means for said spool including a clutch and arranged when operated in one direction to couple said clutch and drive said spool and when operated in the reverse direction to uncouple said clutch and permit free rotation of said spool, a device continuously effective upon said clutch during its entire rotation and tending to prevent rotation of the entire driving means for preventing accidental coupling of said clutch when uncoupled until said driving means is actuated, and means for holding said device against movement.

5. A fishing reel, comprising a frame, a spool therein, driving means for said spool including a clutch and arranged when operated in one direction to couple said clutch and positively drive said spool and when operated in the reverse direction to uncouple said clutch and to permit free rotation of said spool, a friction device continuously effective upon said clutch during its entire rotation and tending to prevent clutch movement for preventing accidental coupling of said clutch when uncoupled until said driving means is actuated, and means for holding the friction means against movement.

6. A fishing reel, comprising a frame, a spool therein, spool driving means including a rotatable clutch, an operating handle for said driving means, means controlled by said handle for disengaging said clutch, a friction device continuously effective upon said clutch during its entire rotation and tending to prevent clutch movement for preventing accidental engagement of said clutch when disengaged until said handle is operated, and means carried by the frame for holding said friction devices against movement.

7. A fishing reel, comprising a frame, a spool therein, spool driving means including a rotatable clutch, an operating handle for said driving means, means controlled by said handle for disengaging said clutch, a friction device continuously effective upon said clutch during its entire rotation for preventing accidental engagement of said clutch when disengaged until said handle is operated, and comprising a drum carried by the clutch member, a yielding band engaging said drum, and connections between said band and drum for holding the same against movement.

8. A fishing reel, comprising a frame, a spool therein, spool driving means including a clutch and two coöperating inclined teeth gears, the inclined teeth of said gears tending to shift them along their axes, one of said gears and said clutch having movement along the gear axis, a friction device constantly effective upon said axially movable gear during its entire rotation and tending to prevent axial movement thereof for preventing accidental coupling of said clutch when uncoupled, and means for holding said friction device against movement.

9. A fishing reel, comprising a frame, a spool, clutch devices therefor, and mechanism for driving said spool and actuating said clutch devices and including a tension device frictionally effective in all positions of the clutch and always tending to prevent movement of said driving mechanism for preventing accidental coupling or uncoupling movement of said clutch.

10. A fishing reel, comprising a frame, a rotatable spool therein, a driving pinion axially alined with and movable longitudinally along the axis of said spool, clutch means between said pinion and spool, a driving member, and connections between said member and pinion arranged upon rotation of said member in one direction to couple said clutch and drive the spool and upon rotation of said member in the opposite direction to uncouple said clutch and permit free rotation of said spool, said connections including a spring member frictionally and continuously effective in all positions of said pinion during complete rotation thereof for preventing its rotation and thereby preventing accidental coupling or uncoupling movement of said clutch.

In testimony whereof I affix my signature.

WALTER L. ADAMS.